(12) United States Patent
Fujiwara (10) Patent No.: US 6,795,210 B1
(45) Date of Patent: Sep. 21, 2004

(54) IMAGE READING APPARATUS

(75) Inventor: Akihiko Fujiwara, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/537,728

(22) Filed: Mar. 30, 2000

(51) Int. Cl.$^7$ .................. G06K 15/00; G06G 15/00
(52) U.S. Cl. ........................ 358/1.18; 399/368
(58) Field of Search .................. 358/501, 401, 358/403, 406, 442, 443, 445, 447, 452, 1.16, 1.18, 474; 355/127; 399/368

(56) References Cited

U.S. PATENT DOCUMENTS

| | | | |
|---|---|---|---|
| 5,867,278 A | 2/1999 | Takahashi et al. | 358/296 |
| 6,014,528 A | 1/2000 | Natsume et al. | |
| 6,594,650 B2 * | 7/2003 | Hasuo | 707/2 |

FOREIGN PATENT DOCUMENTS

| | | | | |
|---|---|---|---|---|
| EP | 0366425 | * 2/1990 | ......... | G03G/15/00 |
| JP | 58-38063 | * 3/1983 | ......... | H04N/1/04 |
| JP | 07044682 | * 2/1995 | ......... | G06T/1/00 |
| JP | 8-018706 A | 1/1996 | | |
| JP | 9-163042 | 6/1997 | | |
| JP | 9-163042 A | 6/1997 | | |
| JP | 10-117273 A | 5/1998 | | |
| JP | 10-142846 A | 5/1998 | | |
| JP | 10-304188 | * 11/1998 | ......... | H04N/1/40 |
| JP | 20002000264 | * 7/2000 | ......... | G06K/9/00 |
| NL | 4227613 | * 2/1994 | ......... | G06K/9/68 |

OTHER PUBLICATIONS

U.S. patent application Ser. No. 09/456,014, Ogaki et al.

* cited by examiner

*Primary Examiner*—Jerome Grant, II
(74) *Attorney, Agent, or Firm*—Foley & Lardner LLP (57) ABSTRACT

The present invention is directed to an image reading apparatus provided with an automatic document feeder (hereinafter referred to as an ADF). The apparatus enables registration of image data as one piece of data even when a document is read as a number of bundles (each bundle includes at least one page and is not more than the loading capacity of the ADF). Owing to this, when document images are divided into two or more bundles for successive reading, different read settings can be determined for the different bundles.

3 Claims, 8 Drawing Sheets

```
INDICATE START OF READING
```

NUMBER OF TIMES OF REPETITION: ONE BUNDLE COMPLETED
ORDER OF REGISTRATION: REVERSE ORDER
READ SETTINGS
   READ MODE: TEXT
   COLOR MODE: MONOCROMATIC
   RESOLUTION: 400dpi
   DENSITY:AUTO
   DOCUMENT SIZE: A4 SIZE
   DOUBLE/SINGLE-SIDED MODE: DOUBLE-SIDED MODE
   IMAGE ROTATION: 0°

NUMBER OF PAGES READ: 20 PAGES
SIZE OF READ DATA

| ALL DELETION | BUNDLE DELETION | READ COMPLETION | SETTINGS ALTERATION | READ START |

FIG. 7

```
READ RESULTS UP TO NOW
```

| BUNDLE NUMBER | NUMBER OF PAGES | SIZE |
|---|---|---|
| 1 | 20 | 360KB |
| TOTAL | 20 | 360KB |

DELETE   UP   DOWN

REGISTER THIS DOCUMENT?  YES  NO

FIG. 8

```
READ RESULTS AT PRESENT:
50 MORE PAGES ARE READABLE UNDER CURRENT SETTINGS
```

```
NUMBER OF TIMES OF REPETITION: TWO BUNDLE COMPLETED
ORDER OF REGISTRATION: REVERSE ORDER

READ SETTINGS
   READ MODE: PHOTO
   COLOR MODE: COLOR
   RESOLUTION: 400dpi
   DENSITY: AUTO
   DOCUMENT SIZE: A4 SIZE
   DOUBLE/SINGLE-SIDED MODE: SINGLE-SIDED MODE
   IMAGE ROTATION: 0°

NUMBER OF PAGES READ: 30 PAGES
SIZE OF READ DATA
```

| ALL DELETION | BUNDLE DELETION | READ COMPLETION | SETTINGS ALTERATION | READ START |

FIG. 9

```
READ RESULTS UP TO NOW
```

| BUNDLE NUMBER | NUMBER OF PAGES | SIZE |
|---|---|---|
| 1 | 20 | 360KB |
| 2 | 10 | 180KB |
| 3 | | |
| 4 | | |
| 5 | | |
| TOTAL | 30 | 540KB |

DELETE   UP   DOWN

REGISTER THIS DOCUMENT?   YES   NO

IMAGE READING APPARATUS

BACKGROUND OF THE INVENTION

The present invention relates to an image reading apparatus for reading a document image fed by an automatic document feeder and registering the read image in a hard disk, for example.

In this type of image reading apparatus, the automatic document feeder (ADF) has a predetermined loading capacity. When a document whose total weight exceeds the loading capacity is registered as one document, successive reading is performed.

In the successive reading, the pages of the document placed on the ADF (i.e., the first bundle of the document) are read, during which the pages that should be subsequently read are designated. When these pages, i.e., another bundle (second bundle) of the document, are placed on the ADF and read, they are registered together with the first bundle of the document.

It should be noted that the first bundle and the second bundle are read under the same read conditions, and different read conditions cannot be determined for them.

BRIEF SUMMARY OF THE INVENTION

An object of the present invention is to provide an image reading apparatus which divides document images into two or more bundles for successive reading, and which enables different read conditions to be determined for different bundles.

Another object of the present invention is to provide an image reading apparatus which divides document images into two or more bundles for successive reading, and which enables results of a read operation for each bundle to be confirmed.

Still another object of the present invention is to provide an image reading apparatus which divides document images into two or more bundles for successive reading, and which enables results of a read operation for each bundle to be edited.

A further object of the present invention is to provide an image reading apparatus which divides document images into two or more bundles for successive reading, and which can cope with an abnormal situation during the read operation for a bundle by restoring that bundle into the original state.

To achieve these objects, the present invention provides an image reading apparatus comprising: setting means for setting a sequential document in units of one bundle; settings-entering means for entering read settings for the document set by the setting means; reading means for sequentially reading each bundle of the document set by the setting means in units of one page on the basis of the read settings entered by the settings-entering means; recording means for recording image data on the document read by the reading means such that the image data corresponding to one bundle are recorded together; alteration means for altering the read settings entered by the settings-entering means when a second or subsequent bundle of the document is set by the setting means; and processing means for causing the reading means to read the document set by the setting means in units of one page and for causing resultant read images to be recorded by the recording means.

The present invention also provides an image reading apparatus comprising: setting means for setting a sequential document in units of one bundle; settings-entering means for entering read settings for the document set by the setting means; reading means for sequentially reading each bundle of the document set by the setting means in units of one page on the basis of the read settings entered by the settings-entering means; recording means for recording image data on the document read by the reading means such that the image data corresponding to one bundle are recorded together; and output means for outputting read results which represent how the reading means reads each bundle of the document and also outputting recording results which represent how the recording means operates.

Further, the present invention provides an image reading apparatus comprising: setting means for setting a sequential document in units of one bundle; settings-entering means for entering read settings for the document set by the setting means; reading means for sequentially reading each bundle of the document set by the setting means in units of one page on the basis of the read settings entered by the settings-entering means; recording means for recording image data on the document read by the reading means such that the image data corresponding to one bundle are recorded together; designation means for designating an alteration of an order in which the image data recorded by the recording means and corresponding to the bundles of the document are arranged; and alteration means for altering the order, in which the image data recorded by the recording means and corresponding to the bundles of the document are arranged, such that the order is based on the designation made by the designation means.

Still further, the present invention provides an image reading apparatus comprising: setting means for setting a sequential document in units of one bundle; settings-entering means for entering read settings for the document set by the setting means; reading means for sequentially reading each bundle of the document set by the setting means in units of one page on the basis of the read settings entered by the settings-entering means; recording means for recording image data on the document read by the reading means such that the image data corresponding to one bundle are recorded together; and processing means, operating when abnormality occurs during read processing which the reading means performs with respect to one of the bundles of the document, for deleting from the recording means image data corresponding to a bundle for which the abnormality occurs, and for restoring the bundle to the original state.

Moreover, the present invention provides an image reading apparatus comprising: setting means for setting a sequential document in units of one bundle; settings-entering means for entering read settings for the document set by the setting means; reading means for sequentially reading each bundle of the document set by the setting means in units of one page on the basis of the read settings entered by the settings-entering means; recording means for recording image data on the document read by the reading means such that the image data corresponding to one bundle are recorded together; first alteration means for altering the read settings entered by the settings-entering means when the setting means sets a second and subsequent bundles of the document; first processing means for causing the reading means to read the document set by the setting means such that the document is read in units of one page on the basis of the read settings altered by the first alteration means, and for controlling the recording means to record read images; output means for outputting read results which represent how the reading means reads each bundle of the document and also outputting recording results which represent how the recording means operates; designation means for designating an alteration of an order in which the image data recorded by the recording means and corresponding to the bundles of the document are arranged; second alternation means for altering an order in which the image data recorded by the recording means and corresponding to the bundles of the document are arranged; and second processing means, operating when abnormality occurs during read processing which the reading means performs with respect to one of the bundles of the document, for deleting from the recording means image data corresponding to a bundle for which the abnormality occurs, and for restoring the bundle to the original state.

DETAILED DESCRIPTION OF THE INVENTION

An embodiment of the present invention will now be described with reference to the accompanying drawings.

Figure 1:
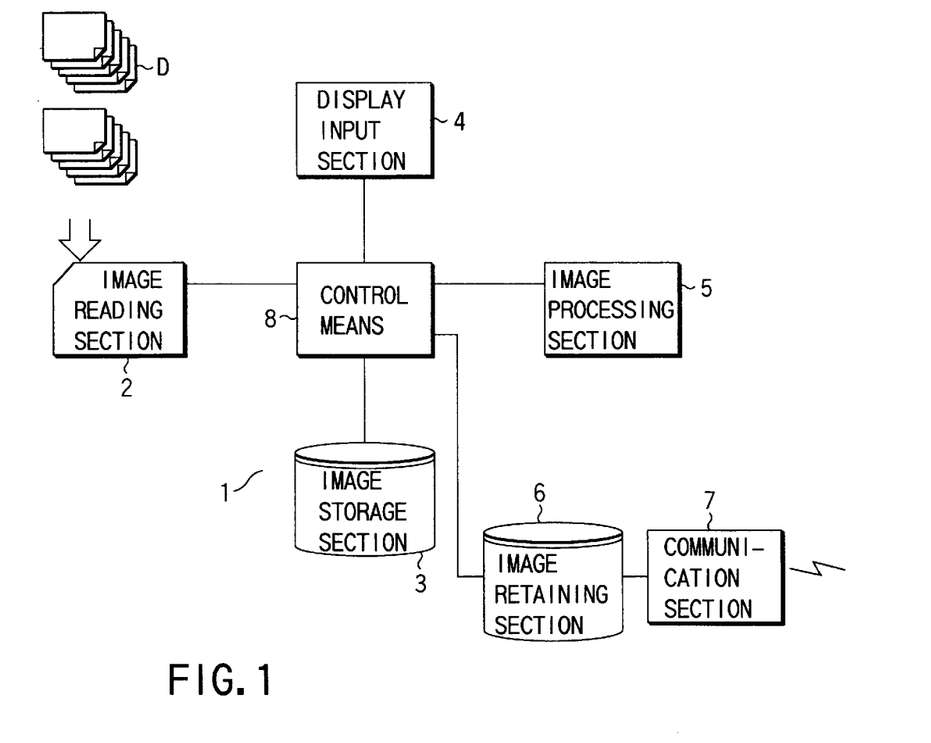
FIG. 1 is a block diagram showing the schematic structure of an image processing system.

FIG. 1 is a block diagram showing the schematic structure of an image processing system 1 according to one embodiment of the present invention.

The image reading system 1 comprises: an image reading section 2 including an automatic document feeder (ADF) which serves as a document feeder means and which feeds pages constituting a document D one by one; an image storage section 3 for reading an image read by the image reading section 2; a display input section 4 including a touch panel which shows operation guides to the user and permits the user to enter various commands; an image processing section 5 for processing a read image (e.g. rotating the image); an image retaining section 6 for storing an image read by the image reading section 2 or an image processed by the image processing section 5; a communicating section 7 connected to a communication line and executing communication with reference to devices on a network; and a controller 8 for controlling the sections described above.

Figure 2:
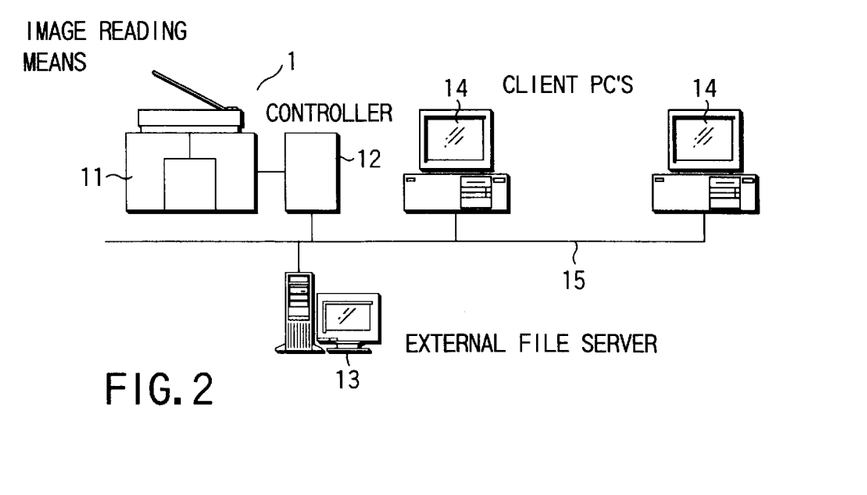
FIG. 2 is a diagram showing the schematic structure of the image processing system.

FIG. 2 shows an example of an environment under which the image reading system is used.

As shown in FIG. 2, the image reading system 1 has a high-speed image reading capacity. It is made up of a digital copying machine 11 which is used in common to a plurality of users, and a controller 12 which registers an image supplied from the digital copying machine 11 and outputs the registered image. A file server 13 for storing a variety of data and a plurality of client PCs 14 (i.e., personal computers) individually used by different users, are connected to the image reading system 1 though a communication line 15. Thus, the image reading system 1 is used in a network environment.

Figure 3:
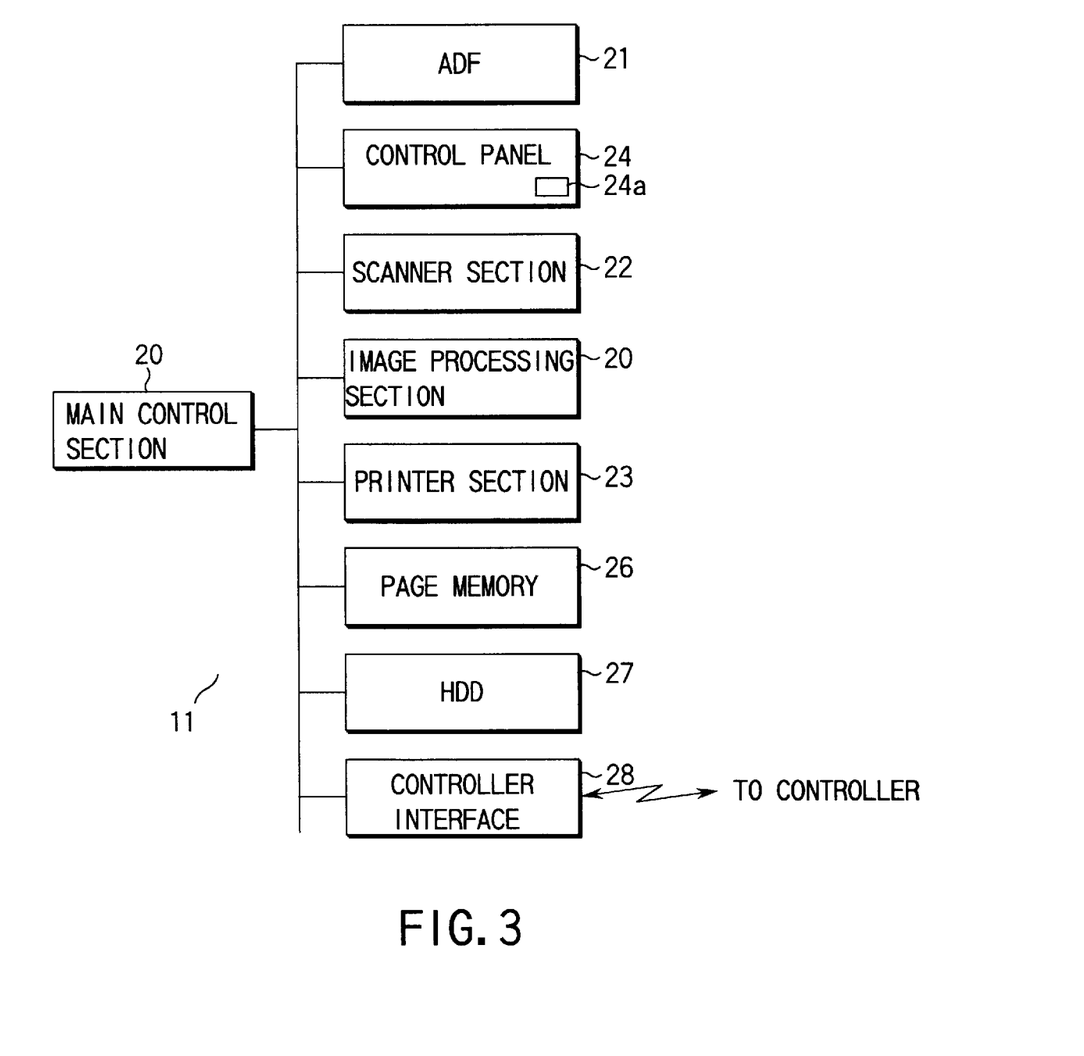
FIG. 3 is a block diagram showing the schematic structure of a digital copying machine.

The internal structure of the digital copying machine 11 will be explained, referring to FIG. 3.

The digital copying machine 11 is provided with a main control section 20 for controlling the entirety of the machine. Although not shown, the main control section 20 includes a CPU (a central processing unit) for controlling the operation, a ROM (a Rend only memory) for storing software used for operating the digital copying machine 11, and a RAM (a random access memory) (an S-RAM) for temporarily storing image data and other kinds of operation data.

To the main control section 20, an automatic document feeder (ADF) 21, a scanner section 22, a printer section 23, a control panel 24, an image processing section 25, a page memory 26, an HDD 27, and a controller interface 28 are connected.

The ADF 21 is an automatic document feeder serving as a feed means. It is arranged on the upper surface of the main body and automatically feeds the pages of the document D set on a document tray (not shown) to a document table (not shown). When a document D made up of a plurality of pages and constituting a predetermined number of units is placed on the document tray, the pages of the document D are fed one by one.

The document D is placed on the document tray 9a of the ADF 9, with the side to be read being turned upward. The pages of the document D are sequentially fed one by one, beginning with the lowermost one.

The scanner section 22 scans the document D placed on the document table, thereby obtaining image data on the document D.

The printer section 23 prints the image data read from the document D or prints image data externally supplied thereto.

The control panel 24 is used as a display/input section. It is made up of a liquid crystal display section 24a incorporating a touch panel, and a hard key, such as a ten-key pad. Various operation commands and designation settings are entered from the touch panel and the hard key. Operation guides and guide messages indicating the kind of an error are displayed on the liquid crystal display section 24a.

The image processing section 25 performs rotation processing with respect to the document image read from the scanner section 22.

The page memory 26 registers image data supplied from the image processing section 25.

The HDD 27 is an external storage device and is exemplified by a hard disk for storing various kinds of data. When a number of copies are made, images corresponding to a plurality of pages of the document are compressed and registered. At the time of printing, the compressed images are read out and printed. The HDD 27 registers image data on a document D set on the document tray of the ADF 21, made up of a number of pages, constituting a predetermined units. The HDD 27 is provided with a maximal image data capacity.

The controller interface 28 is connected to the controller 12 and exchanges data therewith.

Figure 4:
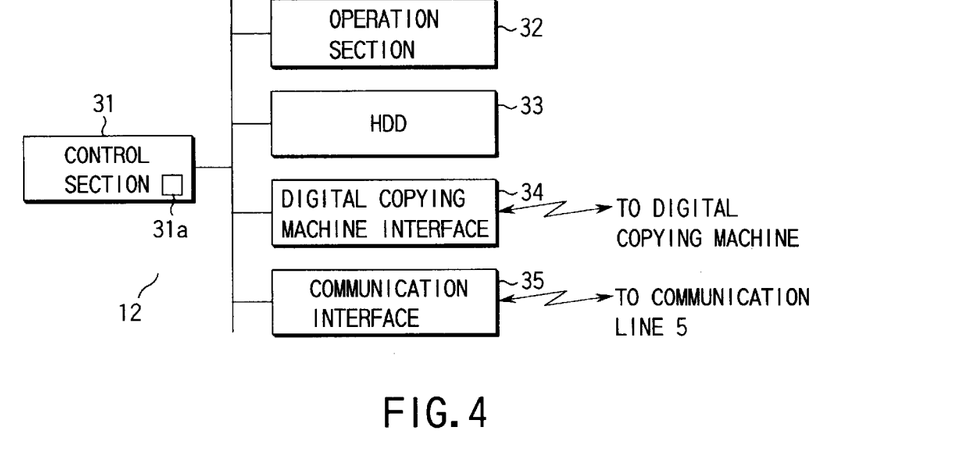
FIG. 4 is a block diagram showing the schematic structure of a controller.

The internal structure of the control circuit of the controller 12 will be described with reference to FIG. 4.

The controller 12 is made of a personal computer and is provided with a control section 31 for controlling the entirety. To the control section 31, the following are connected: an operation section 32 made up of a keyboard and a display section; an HDD 33 for registering image data; a copying machine interface 34 connected to the controller interface 28 of the digital copying machine 1; and a communication interface 35 connected to a network through the communication line 15.

The control section 31 processes image data on a sequential document as one piece of data and stores it in the HDD 33.

The control section 31 includes a memory section 31a. In this memory section 31a, the recording capacity corresponding to the image data on each bundle of sequential document stored in the HDD 33 and a total recording capacity are accumulatively registered.

The control section 31 determines that abnormality occurs when the total recording capacity corresponding to a sequential document exceeds a maximal image data capacity.

The HDD 33 stores image data supplied from the digital copying machine 11 and is provided with a maximal image data capacity.

The HDD 27 of the digital copying machine 11 is used when a plurality of copies are made from one original document. The HDD 33 of the controller 12 is used when read image data is transmitted through a network A description will be given as to how the pages of the document D set on the tray of the ADF 21 are sequentially read and registered. The description will be given, referring to the flowchart shown in FIG. 5.

Example of Registration 1

Let is be assumed that one sequential document D contains different types of pages. Since it is desired that the read settings be changed in the midst of the processing of the document, the sequential document is divided into a plurality of bundles.

By way of example, let us take a 40-sheet, 50-page document, wherein the 1st to 10th sheets are 10-page single-sided texts, the 11th to 20th sheets are 10-page single-sided monochromatic diagrams, the 21st to 30th sheets are 10-page single-sided color catalogs, and the 31st to 40th sheets are 20-page double-sided accompanying papers. A description will be given as to how this sequential document D will be registered as one piece of (consecutive) image data.

In this case, the 31st to 40th sheets, namely, double-side 20 pages accompanying papers, are handled as the first bundle of the document D, and are set on the document tray of the ADF 21, with the sides to be read being directed upward. Then, the 21st to 30th sheets, namely, the single-sided 10-page color catalogs, are handled as the second bundle of the document D, and are set on the document tray of the ADF 21, with the sides to be read being directed upward. Subsequently, the 11th to 20th sheets, namely, the single-sided 10-page monochromatic diagrams, are handled as the third bundle of the document D, and are set on the document tray of the ADF 21, with the sides to be read being directed upward. Lastly, the 1st to 10th sheets, namely, the single-sided 10-page texts, are handled as the fourth bundle of the document D, and are set on the document tray of the ADF 21, with the sides to be read being directed upward.

The reason for handling the document as several bundles is to enable different read-settings to be determined for the different bundles. In some cases, a document has to be handled as a number of bundles for other reasons, such as the loading capacity of the ADF 21, and the limit of the number of sheets that the copying machine 1 can read as one bundle (the total image data size of one bundle).

Figure 5:
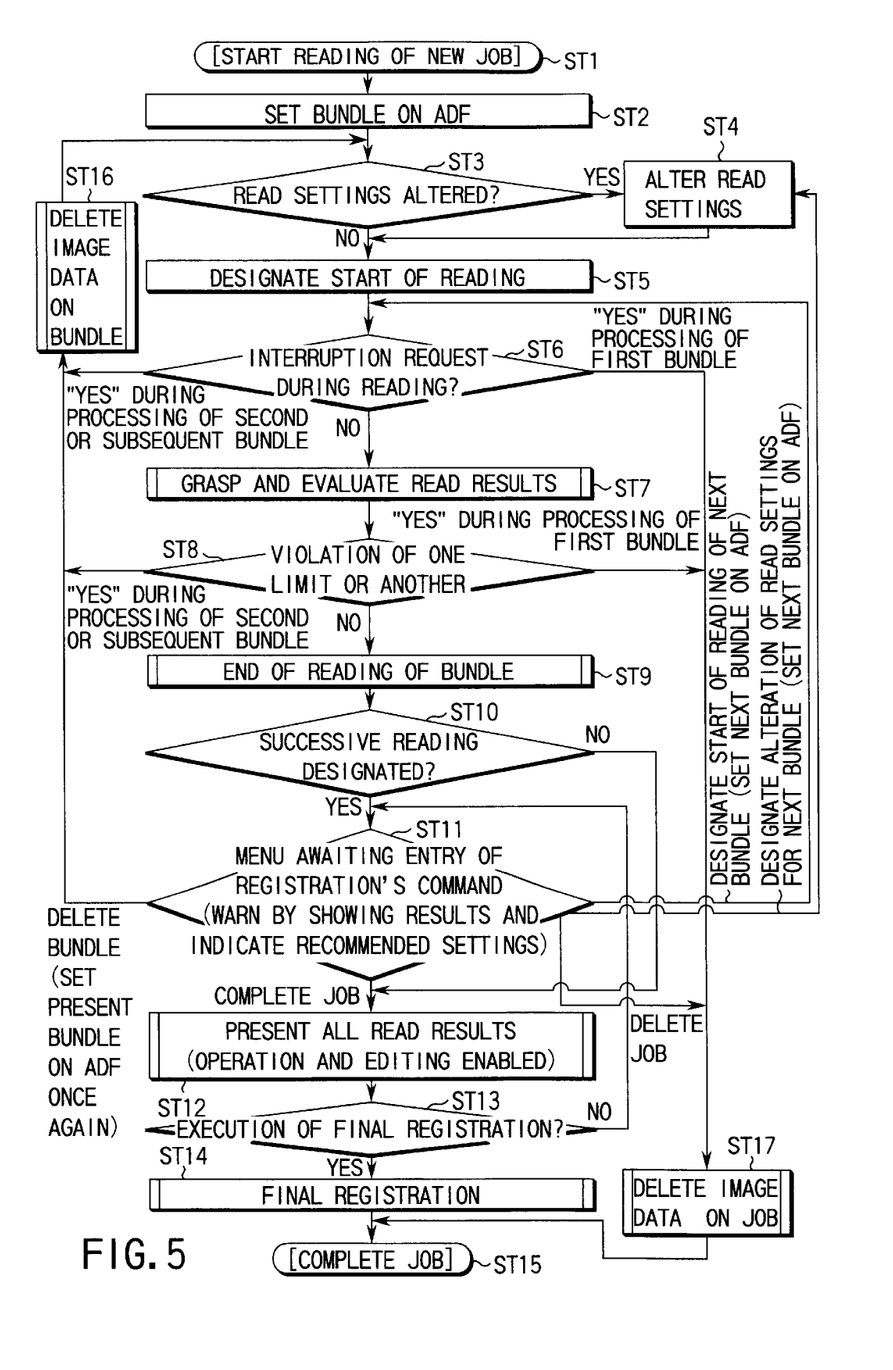
FIG. 5 is a flowchart illustrating scan processing.

The registrant designates new image registration by operating the liquid crystal display section 24a. In response to this, the main control section 20 determines whether or not a new read job has been started (ST 1), and causes the liquid crystal display section 24a to display a selection menu, on which the printer function, management function, scan function, etc. can be selected. On the basis of the display menu, the registrant selects the selects the scan function. On the basis of the selection of the scan function, the main control section 20 indicates a variety of job icons registered beforehand.

The job icons are used to enter scan parameters, such as the order of registration, a read mode, a color mode, a resolution, a density, a document size, double/single-sided mode, image rotation, etc. The order of registration is either a normal order or a reverse order. The read mode is either a photographic mode or a text mode. The color mode is either a color mode or a monochromatic mode. The resolution is 200 dpi, 400 dpi or 600 dpi. The density is either auto or manual. The document size is one of A4 size, B4 size, B5 size, etc. The double/single-sided mode is either a double-sided read mode or a single-sided read mode. The image rotation is one of 0°, 90°, 180° and 270° rotations.

One of the job icons is selected on the basis of the indications thereon. In the present case, the selection of the job icon determines the scan parameters in such a manner that the order of registration is a "reverse order", the read mode is "text", the color mode is "monochromatic", the resolution is "400 dpi", the density is "auto", the document size is "A4 size", the double/single-sided mode is a "double-sided" mode, and the image rotation is "0°."

At this stage, no designation has been made as to whether or not successive reading is to be executed.

Then, the registrant sets the 31st to 40th sheets, namely, double-sided 20 pages accompanying papers, on the document tray of the ADF 21 as the first bundle of the document D (ST 2). After confirming the list of the read settings displayed on the control panel 24 (ST 3), the registrant presses either the start button or the start icon of the liquid crystal display section 24a to designate the start (ST 5).

It is possible to designate alteration of the read settings in the state where the list of the read settings of Step ST 3 is displayed. In this case, the settings are altered on the settings alteration menu (ST 4), either the start button or the start icon of the liquid crystal display section 24a is depressed to designate the start (ST 5).

Since the list of the read settings is kept displayed, the registrant can confirm whether or not alteration is required.

In response to the designation of the start, the lowermost sheet of the document D is conveyed by the ADF 21. The image on one side of that sheet document D is read by the scanner section 22, and the image data is stored in the page memory 26. The scanner section 22 performs the read operation on the basis of the scan parameters of the scanner job.

When image data corresponding to one page are recorded in the page memory 26, the main control section 20 outputs one-page image data of the page memory 26 to the controller 12 on the basis of the inquiry from the control section 31 of the controller 12. Accordingly, the control section 31 of the controller 12 records the supplied one-page image data in the HDD 33.

In the meantime, the control section 31 of the controller 12 causes the memory section 31a to accumulatively record the recording capacity of the image data group for each bundle of a document, along with the total recording capacity.

Then, the ADF 21 inverts the document D so as to read the other side of the document D. The image data on the second side are recorded in the page memory 26.

When image data corresponding to one page are recorded in the page memory 26, the main control section 20 outputs one-page image data of the page memory 26 to the controller 12 on the basis of the inquiry from the control section 31 of the controller 12. Accordingly, the control section 31 of the controller 12 records the supplied one-page image data in the HDD 33.

In the meantime, the control section 31 of the controller 12 causes the memory section 31a to accumulatively record the recording capacity of the image data group for each bundle of a document, along with the total recording capacity. Thereafter, the processing returns to the feeding of the pages of the document D.

The processing starting from the feeding of the pages and ending to the accumulative recording processing of the image data capacity is repeated.

During the processing for the first bundle, the registrant may designate an interruption (by depressing the stop key of the control panel 22). Alternatively, it may happen that an unrecoverable error may occur in the digital copying machine 11 or the controller 12 (jamming of a document D or a recording error in the HDD 33) (ST 6). In this case, the main control section 20 determines that the read operation should be interrupted and deletes the image data from the HDD 33. In addition, the main control section 20 deletes the capacity accumulatively recorded in the memory section 31a, and the read job is therefore put to an end. (ST 17).

When the processing for the first bundle is being executed, the main control section 20 controls the liquid crystal display section 24a to display the number of pages subjected to image reading until then, and also display the number of image recording pages (ST 7). On the liquid crystal display section 24a, the message "Reading Continued?" and the icon used for selecting the successive reading operation are kept displayed.

When the processing for the first bundle is being processed, the control section 31 determines whether or not the total recording capacity of the sequential document recorded in the memory section 31a has exceeded the maximal image data capacity (limit size). If the determination shows that the total recording capacity has exceeded the maximal image data capacity, the control section 31 determines that the first bundle has exceeded the limitations. Based on this determination, the control section 31 deletes the image data on the bundle from the HDD 33 and also deletes the accumulative recording capacity corresponding to the bundle. In this manner, the main control section 20 deletes the image data from the page memory, thus completing the read job (ST 17).

When the processing for the first bundle is completed in a normal manner, that is, when all pages of the documents D set on the document tray of the ADF 21 have been fed and the image data read therefrom have been recorded in the HDD 33, the main control section 20 and the control section 31 determine the end of the reading of the bundle (ST 9).

Figure 8:
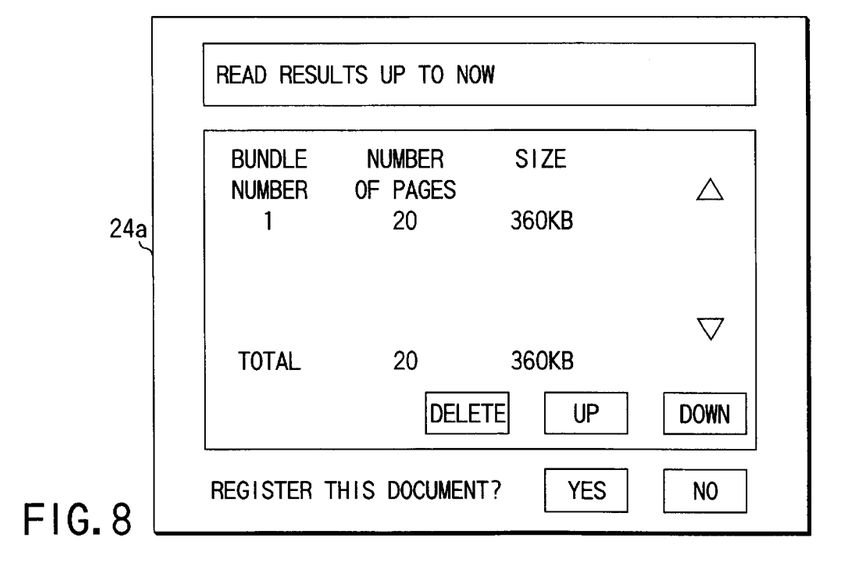

If the successive reading is not selected (designated) by the registrant (ST 10), the main control section 20 controls the liquid crystal display section 24a to display all read results, "Delete", "UP" and "DOWN" icons for editing, and the guide message "Registration of Document?" along with "YES" and "NO" icons (ST 12), as shown in FIG. 8.

When the "YES" icon is depressed on the menu, the control section 31 records the image data corresponding to one bundle in the HDD 33 as one group of document image data group (ST 14). Thereafter, the main control section 20 and the control section 31 complete the read job (ST 15).

Figure 7:
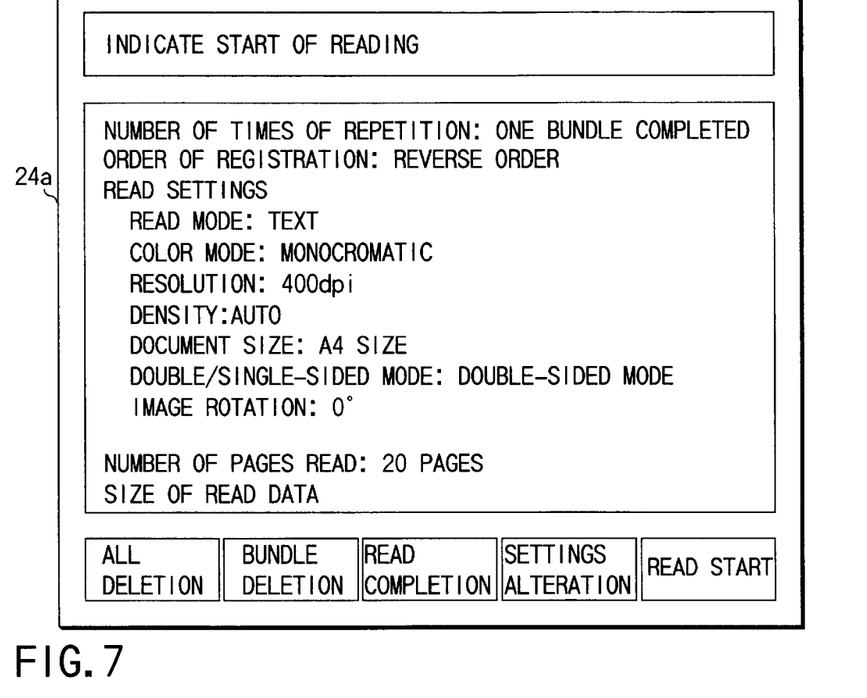
FIGS. 7–14 shows examples of messages displayed in the liquid crystal display section.

If the successive reading is selected (designated) by the registrant in Step 10 described above, the main control section 20 controls the liquid crystal section 24a to show the scan parameters and results of processing corresponding to the first bundle (ST 11), as shown in FIG. 7. At the time, the liquid crystal control section 24a displays the message indicating that the number of times of repetition corresponds to the completion of one bundle, the order of registration is the reverse order, the read mode (read settings) is "text", the color mode is "monochromatic", the resolution is "400 dpi", the document size is "A4", the double/single-sided mode is the "double-sided" mode, the image rotation is "0°", the number of read pages is "20", and the read data size is 360 KB. Simultaneous with this, the "All Deletion", "Bundle Deletion", "Read Completion", "Settings Alteration", and "Read Start" icons are displayed.

The "All Deletion" icon is depressed when the image data corresponding to all bundles of the sequential document are deleted from the HDD 33. The "Bundle Deletion" icon is depressed when the image data corresponding to one of the bundles of the sequential document are deleted from the HDD 33. The "Read Completion" icon is depressed when the read job is finished. The "Settings Alteration" icon is depressed when the scanner parameters used for the last bundle are altered. The "Read Start" icon is depressed when the reading of the document set on the ADF 21 is started.

The menu described above is kept displayed until the registrant enters a command. On the menu, results are displayed, a warning message is shown, and recommendable settings are indicated.

When the reading of the next bundle is started in this display state, i.e., when the registrant sets the 21st to 30th sheets, namely, 10-page single-sided color catalogs, on the document tray of the ADF 21 as the second bundle of the document D, it is necessary to alter the read settings. Accordingly, the registrant depresses the "Settings Alteration" icon.

In response to the "Settings Alteration" icon being depressed, the main control section 20 determines that the settings alteration mode for altering the read settings (scan parameters) has been selected. Accordingly, the main control section 20 controls the liquid crystal display section 24a to display the settings alteration menu used for altering the read settings. Based on this display, the read settings are altered (ST4). In this case, the read mode is changed to "photograph", and the color mode is changed to "color." Then, the registrant depresses either the start button of the control panel 24 or the start icon of the liquid crystal display section 24a, thereby designating the start of the operation (ST 5).

In response to this, the image which the scanner section 22 reads from the document D fed by the ADF 21 are recorded in the page memory 26, and are then recorded in the HDD 33 of the controller 12.

The control section 31 of the controller 12 accumulatively records image data groups corresponding to the bundles of the sequential document and the total recording capacity in the memory section 31a. Thereafter, the processing returns to the feeding of the document D.

The processing starting from the feeding of the document D and ending to the accumulative recording processing of the image data capacity is repeated.

During the processing for the second bundle, the registrant may designate an interruption (by depressing the stop key of the control panel 22). Alternatively, it may happen that an unrecoverable error may occur in the digital copying machine 11 or the controller 12 (jamming of a document D or a recording error in the HDD 33) (ST 6). In this case, the main control section 20 deletes the image data from the HDD 33 and further deletes the image data corresponding to the second bundle from the HDD 33 (the image data corresponding to the first bundle are retained). In addition, the main control section 20 deletes the capacity that has been accumulatively recorded in the memory section 31a in relation to the second bundle (ST 16), and the main control section 20 returns to the state in which it was at the start of the processing of the second bundle.

After the deletion, the main control section 20 executes the processing similar to that of step 11 described above. That is, the main control section 20 controls the liquid crystal display section 24a to show the scan parameters and results of processing corresponding to the first bundle, as shown in FIG. 7. At the time, the liquid crystal control section 24a displays the message indicating that the number of times of repetition corresponds to the completion of one bundle, the order of registration is the reverse order, the read mode (read settings) is "text", the color mode is "monochromatic", the resolution is "400 dpi", the document size is "A4", the double/single-sided mode is the "double-sided" mode, the image rotation is "0°", the number of read pages is "20", and the read data size is 360 KB. Simultaneous with this, the "All Deletion", "Bundle Deletion", "Read Completion", "Settings Alteration", and "Read Start" icons are displayed.

In this display state, the registrant sets the document D corresponding to the second bundle on the document tray of the ADF 21 once again, and then depresses the icon for settings alteration. Then, the processing advances to step 4.

Figure 6:
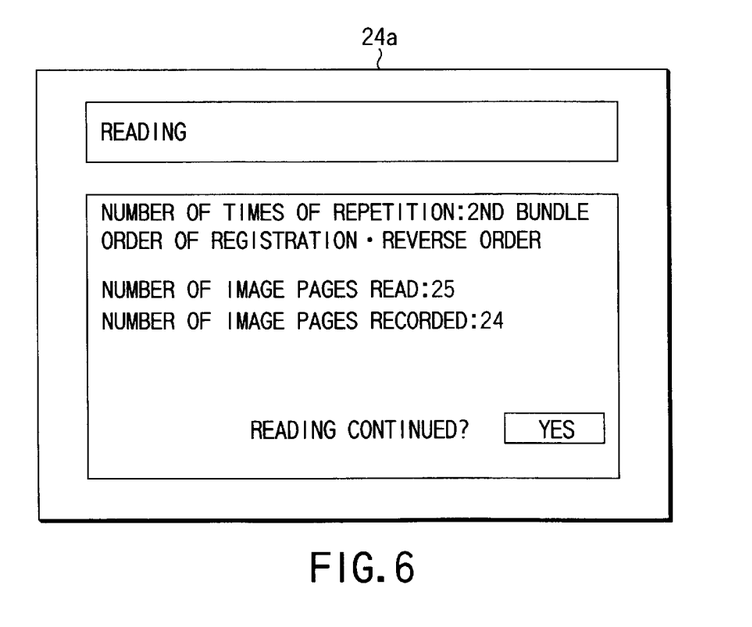
FIG. 6 is a flowchart showing how the image processing system reads pages belonging to one document.

When the processing for the second bundle is being processed, the main control section 20 controls the liquid crystal display section 24a to display the number image pages read until then, and also display the number of image pages recorded (ST 7), as shown in FIG. 6. On the liquid crystal display section 24a, the message as to whether or not the reading should be continued and the icon used for selecting the successive reading operation are kept displayed.

When the processing for the second bundle is being processed, the control section 31 determines whether or not the total recording capacity of the sequential document recorded in the memory section 31a has exceeded the maximal image data capacity (limit size) (ST 8). If the determination shows that the total recording capacity has exceeded the maximal image data capacity, the control section 31 determines that the first bundle has exceeded the limitations. Based on this determination, the control section 31 deletes the image data on the second bundle from the HDD 33 and also deletes the accumulative recording capacity corresponding to the second bundle (ST 16).

Figure 11:
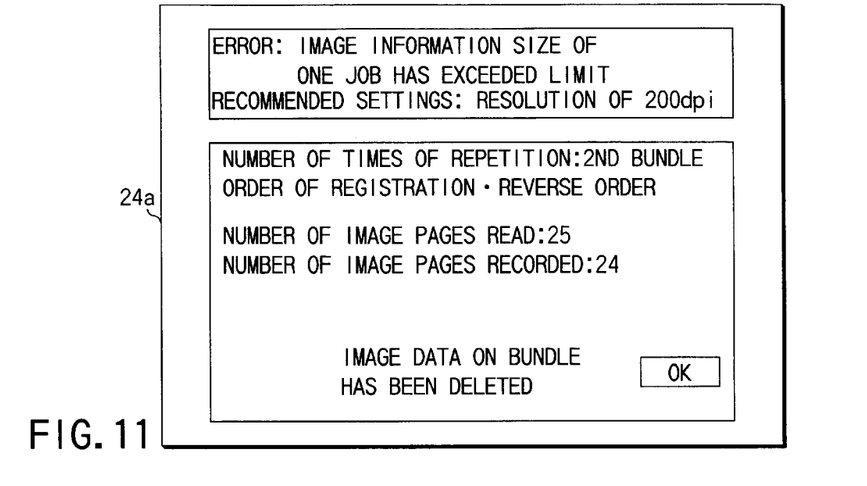

After this deletion, the main control section 20 controls the liquid crystal display section 24a to show the warning message regarding limitations, namely, "Error: Image Data Size of One Job Has Exceeded Limitations", and recommended settings of "Resolution: 200 dpi". In addition, the liquid crystal display section 24a shows the message indicating that the number of times of repetition corresponds to "Second Bundle", the order of registration is "Reverse Order", the number of pages subjected to image reading is "25" and the number of pages subjected to image recording. On the liquid crystal display section 24a, the message "Image Corresponding to Bundle Have Been Deleted" and the icon used for entering "OK" are kept displayed.

Figure 12:
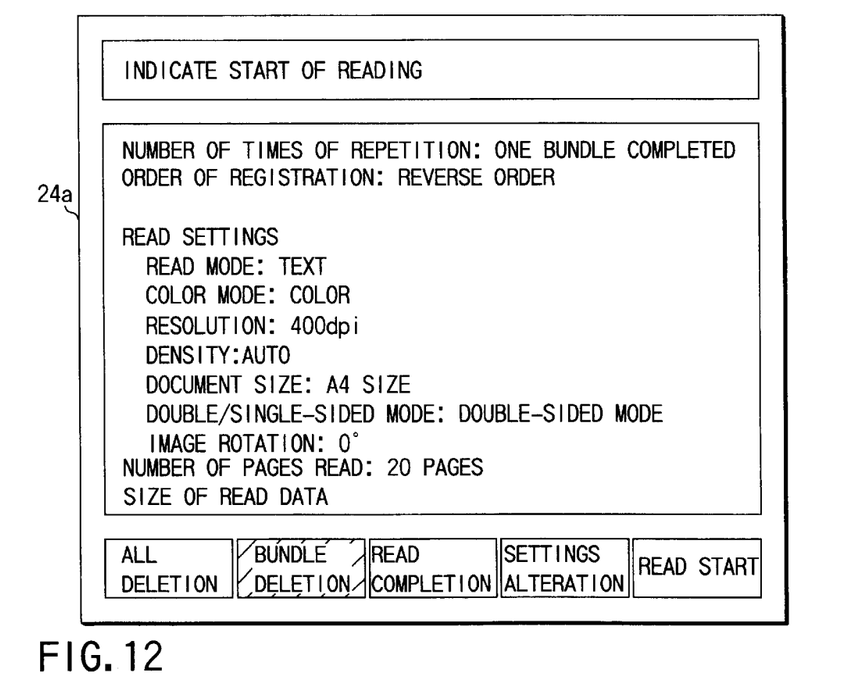

When the "OK" icon has been depressed in this display state, the main controller 20 executes processing similar to that of step 11 described above. That is, the main control section 20 controls the liquid crystal section 24a to show the scan parameters and results of processing corresponding to the bundle, as shown in FIG. 12. At the time, the liquid crystal control section 24a displays the message indicating that the number of times of repetition corresponds to the completion of one bundle, the order of registration is the reverse order, the read mode (read settings) is "text", the color mode is "monochromatic", the resolution is "400 dpi", the document size is "A4", the double/single-sided mode is the "double-sided" mode, the image rotation is "0°", the number of read pages is "20", and the read data size is 360 KB. Simultaneous with this, the "All Deletion", "Bundle Deletion", "Read Completion", "Settings Alteration", and "Read Start" icons are displayed.

In this display state, the registrant sets the document D corresponding to the second bundle on the document tray of the ADF 21 once again, and then depresses the icon for settings alteration. Then, the processing advances to step 4.

When the processing for the second bundle is completed in a normal manner, that is, when all pages of the document D set on the document tray of the ADF 21 have been fed and the image data read therefrom have been recorded in the HDD 33, the main control section 20 and the control section 31 determine the end of the reading of the bundle (ST 9).

Figure 10:
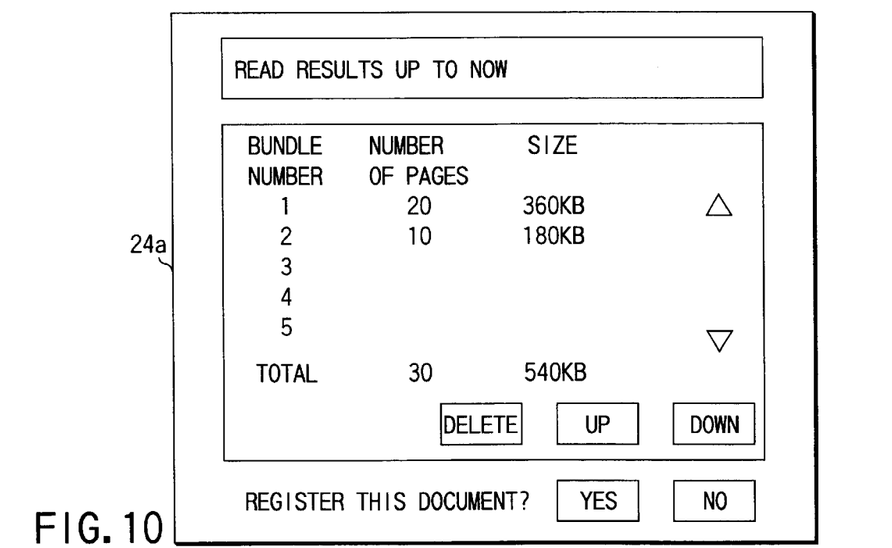

If the successive reading is not selected (designated) by the registrant (ST 10), the main control section 20 controls the liquid crystal display section 24a to display all read results, "Delete", "UP" and "DOWN" icons for editing, and the guide message "Registration of Document?" along with "YES" and "NO" icons (ST 12), as shown in FIG. 10.

If, in this display state, bundle number 1 is selected, and the "DOWN" icon is depressed, the contents of bundle number 2 are shown in place of those of bundle number 1. The "DOWN" icon and the "UP" icon can be used for changing the order of recording. If bundle number 1 corresponds to the unnecessary bundle, bundle 1 is selected and the "Delete" icon is depressed, thus deleting the contents of bundle number 1.

If the "YES" icon is depressed in the display state (ST 13), the control section 31 determines that the processing comes to final recording, and the image data corresponding to the bundle are recorded in the HDD 33 as a group of document image data (ST 14). Thereafter, the main control section 20 and the control section 31 complete the read job (ST 15).

If the registrant depresses the "NO" icon in the display state of step 12, the controller 31 advances to step 11.

Figure 9:
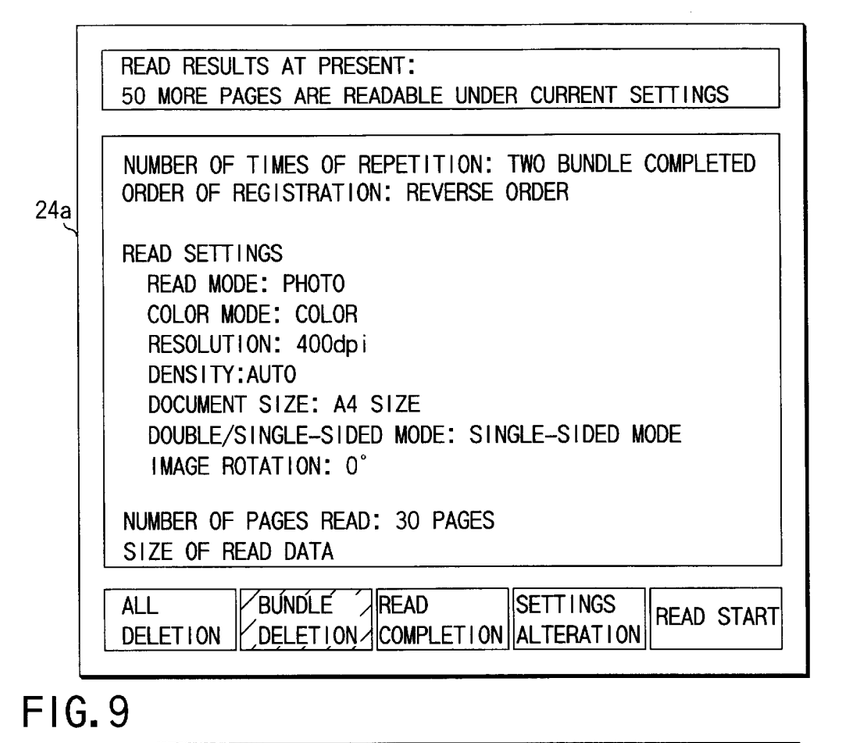

If the successive reading is selected (designated) by the registrant in Step 10 described above, the main control section 20 controls the liquid crystal section 24a to show the scan parameters and results of processing corresponding to the second bundle (ST 11), as shown in FIG. 9. At the time, the liquid crystal control section 24a displays the message indicating that the number of times of repetition corresponds to the completion of one bundle, the order of registration is the reverse order, the read mode (read settings) is "photograph", the color mode is "color", the resolution is "400 dpi", the document size is "A4", the double/single-sided mode is the "double-sided" mode, the image rotation is "0°", the number of read pages is "30", and the read data size is 540 KB. Simultaneous with this, the "All Deletion", "Bundle Deletion", "Read Completion", "Settings Alteration", and "Read Start" icons are displayed.

In the state where the information on the second bundle is displayed in step 11, the registrant sets the third bundle of the document on the document tray of the ADF 21, and then depresses the "Settings Alteration" icon, thereby advancing to step 4.

The recording processing for the third and fourth bundles of the document D is executed with respect to the HDD 33 in a similar manner to that described above.

When the recording processing for the fourth bundle of the document D has been executed with respect to the HDD 33 (ST 9), the successive recording is not designated (ST 10). Consequently, the main control section 20 advances to step 12. In this step, the main control section 20 controls the liquid crystal display section 24a to display all read results, "Delete", "UP" and "DOWN" icons for editing, and the guide message "Registration of Document?" along with "YES" and "NO" icons (ST 12).

If the "YES" icon is depressed in the display state (ST 13), the control section 31 determines that the processing comes to final recording, and the image data corresponding to the fourth bundle are recorded in the HDD 33 as a group of document image data (ST 14). Thereafter, the main control section 20 and the control section 31 complete the read job (ST 15).

If the "All Deletion" icon is depressed in the display state of step 11 described above, the processing advances to step S17. Likewise, the processing advances to step 16 if the "Bundle Deletion" icon is depressed, to step 12 if the "Read Completion" icon is depressed, to step 4 if the "Settings Alteration" icon is depressed, and to step 6 if the "Read Start" icon is depressed.

In the command-awaiting menu displayed when the processing returns from step 13 to step 11, the icon for the bundle deletion cannot be selected.

Figure 13:
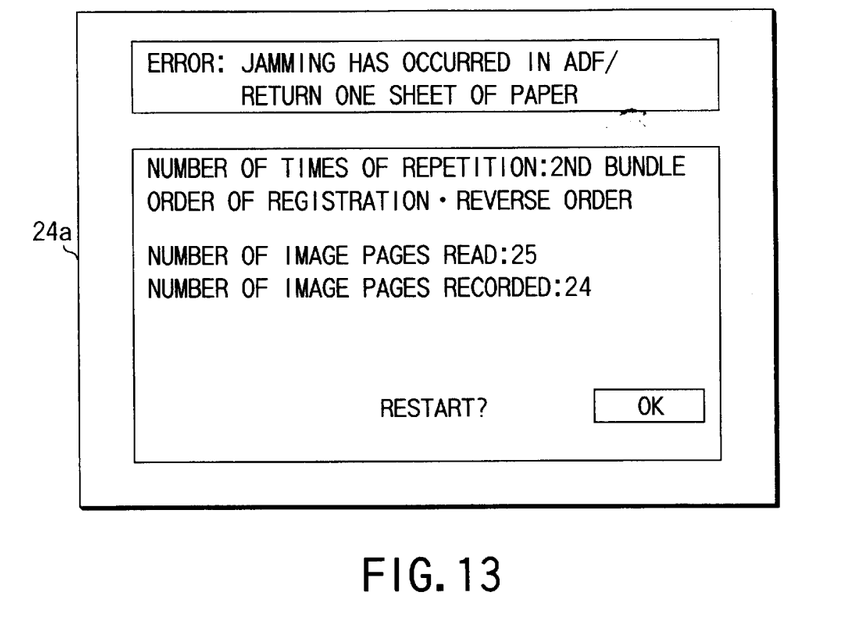
Figure 14:
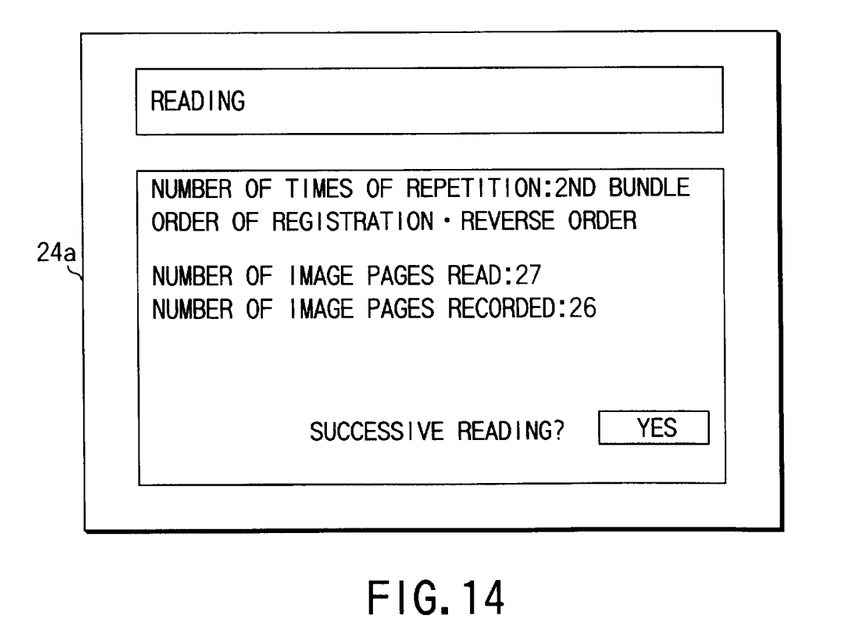

In the embodiment described above, if the jamming of a document D occurs in step 6, the bundle of the document D is checked. If that bundle is the first bundle, the image data on the job of step 17 are deleted. If it is the second or subsequent bundle, the image data on the bundle that is being processed in step 16 are deleted. However, this in no way restricts the present invention. For example, the registrant may remove the jamming of the document D, set it on the ADF 21 once again, and restart the operation. In this case, the main control section 20 controls the liquid crystal display section 24a to show a guide menu, such as that shown in FIG. 13, so as to indicate the occurrence of jamming in the ADF. When the jamming is removed on the basis of the displayed menu, and the restart is designated, a menu (such as that shown in FIG. 6) indicating that a read operation is being executed, is displayed, as shown in FIG. 14.

As described above, present invention is directed to an image reading apparatus which is provided with an automatic document feeder (hereinafter referred to as an ADF) and which enables registration of image data as one piece of data even when a document is read as a number of bundles (each bundle includes at least one page and is not more than the loading capacity of the ADF).

Owing to this, when document images are divided into two or more bundles for successive reading, different read settings can be determined for different bundles.

In addition, when document images are divided into two or more bundles for successive reading, results of a read operation for each bundle can be confirmed.

Further, when document images are divided into two or more bundles for successive reading, results of a read operation for each bundle can be edited.

Moreover, when document images are divided into two or more bundles for successive reading, an abnormal situation during the read operation for a bundle can be coped with by restoring that bundle into the original state.

In the embodiment described above, if the limit based on the maximal image data capacity handled by a controller is exceeded during the read processing of a bundle in step 8, the bundle of the document D is checked. If that bundle is the first bundle, the image data on the job of step 17 are deleted. If it is the second or subsequent bundle, the image data on the bundle that is being processed in step 16 are deleted. However, this in no way restricts the present invention. For example, when the limit based on the maximal image data capacity handled by a controller is about to be exceeded during the read processing of a bundle in step 8, the image data on the job of step 17 may be deleted if the related bundle is the first one, and the image data on the bundle that is being processed in step 16 may be deleted if the bundle in question is the second or subsequent one.

A check may be made as to whether the limit based on the maximal image data capacity corresponding to one bundle handled by the digital copying machine has been exceeded, or whether that limit is about to be exceeded. These conditions may be used as a basis for determination in step 8.

In addition, the determination in step 8 may be made when the bundle is being read or after the bundle is read.

In other words, when one bundle is being read or after it is read, the read results corresponding to each bundle and the accumulative read results are automatically checked and presented to the registrant. If the registrant determines that the registration of the bundle that is being read is not proper, then the registrant can cancel the registration of that bundle and restore it into the original state.

The registrant can make a judgment based on a predetermined limit. If one limit or another is violated, the related bundle can be automatically canceled and restored into the original state. Since the registrant is informed of the results of judgment, he or she can alter the settings to be appropriate to a reread operation.

Alternatively, the registrant can make a judgment based on a predetermined limit. If one limit or another is about to be reached, the registrant is warned and notified of recommended settings. Based on this notification, the registrant can make the final decision as to whether or not the corresponding bundle or already-read bundles should be registered. In addition, the registrant can alter the read settings for the subsequent bundles to be appropriate.

After a plurality of bundles are read, the read results can be comprehensibly indicated as a list. If the already-read bundles include one about which the final determination is made as being improper to registration, such a bundle can be designated for operation and editing.

Even if the reading operation of a bundle is interrupted for some reason or other, the interruption has an effect only on that bundle. In other words, the data obtained by the registration operation performed before the interruption of the bundle can be retained. As a result, the registration can be resumed with a minimum extra operation at the time of the occurrence of a trouble.

What is claimed is:

1. An image reading apparatus comprising:

setting means for setting a sequential document in units of one bundle;

settings-entering means for entering read settings for the document set by the setting means;

reading means for sequentially reading each bundle of the document set by the setting means in units of one page on the basis of the read settings entered by the settings-entering means;

recording means for recording image data on the document read by the reading means such that the image data corresponding to one bundle are recorded together; and processing means, operating when abnormality occurs during read processing which the reading means performs with respect to one of the bundles of the document, for deleting from the recording means image data corresponding to a bundle for which the abnormality occurs, and for restoring the bundle to an original state.

2. An image reading apparatus comprising:

setting means for setting a sequential document in units of one bundle;

settings-entering means for entering read settings for the document set by the setting means;

reading means for sequentially reading each bundle of the document set by the setting means in units of one page on the basis of the read settings entered by the settings-entering means;

recording means for recording image data on the document read by the reading means such that the image data corresponding to one bundle are recorded together;

alteration means for altering the read settings entered by the settings-entering means when a second or subsequent bundles of the document are set by the setting means; and processing means for causing the reading means to read the document set by the setting means in units of one page and for causing resultant read images to be recorded by the recording means, wherein the read settings entered by the settings-entering means include settings regarding a read mode, a color mode, a resolution, a document size, a double/single-sided mode and an image rotation.

3. An image reading apparatus comprising:

setting means for setting a sequential document in units of one bundle;

settings-entering means for entering read settings for the document set by the setting means;

reading means for sequentially reading each bundle of the document set by the setting means in units of one page on the basis of the read settings entered by the settings-entering means;

recording means for recording image data on the document read by the reading means such that the image data corresponding to one bundle are recorded together;

first alteration means for altering the read settings entered by the settings-entering means when the setting means sets a second and subsequent bundles of the document;

first processing means for causing the reading means to read the document set by the setting means such that the document is read in units of one page on the basis of the read settings altered by the first alteration means, and for controlling the recording means to record read images;

output means for outputting read results which represent how the reading means reads each bundle of the document and also outputting recording results which represent how the recording means operates;

designation means for designating an alteration of an order in which the image data recorded by the recording means and corresponding to the bundles of the document are arranged;

second alternation means for altering an order in which the image data recorded by the recording means and corresponding to the bundles of the document are arranged; and second processing means, operating when abnormality occurs during read processing which the reading means performs with respect to one of the bundles of the document, for deleting from the recording means image data corresponding to a bundle for which the abnormality occurs, and for restoring the bundle to the original state.

* * * * *